United States Patent [19]

Mitachi et al.

[11] 4,308,066
[45] Dec. 29, 1981

[54] GLASS FOR OPTICAL FIBERS

[75] Inventors: Seiko Mitachi; Shuichi Shibata; Terutoshi Kanamori; Toyotaka Manabe, all of Mito; Mitsuho Yasu, Katsuta, all of Japan

[73] Assignee: Nippon Telegraph & Telephone Public Corporation, Tokyo, Japan

[21] Appl. No.: 189,757

[22] Filed: Sep. 23, 1980

[30] Foreign Application Priority Data

Oct. 30, 1979 [JP] Japan .................................. 54/139328
Nov. 19, 1979 [JP] Japan .................................. 54/148882

[51] Int. Cl.³ .......................... C03C 3/18; C03C 13/00
[52] U.S. Cl. .......................................... 501/37; 501/40; 501/904
[58] Field of Search ................................ 106/47 Q, 50
[56] References Cited

U.S. PATENT DOCUMENTS 2,466,509 4/1949 Sun ...................................... 106/47 R
4,141,741 2/1979 Lucas et al. ........................ 106/47 Q

FOREIGN PATENT DOCUMENTS 570108 2/1959 Canada ............................. 106/47 Q
44442 6/1961 Poland ............................. 106/47 Q

OTHER PUBLICATIONS

Baldwin, C. M., "Preparation and Properties of Water--Free Vitreous Beryllium Fluoride", Journal Non-Crystalline Solids, 31, (1979), pp. 441-445.

Primary Examiner—O. R. Vertiz
Assistant Examiner—Mark Bell
Attorney, Agent, or Firm—Frishauf, Holtz, Goodman & Woodward

[57] ABSTRACT

Glass for optical fibers is made of material of a binary system containing a fluoride selected from $BaF_2$, $SrF_2$, $CaF_2$ and $PbF_2$ and another fluoride selected from $AlF_3$ and $ZrF_4$.

8 Claims, 15 Drawing Figures

GLASS FOR OPTICAL FIBERS

The present invention relates to glass for optical fibers made of material of a binary system and, more particularly, to glass for optical fibers with a transmitting window in an infrared wavelength region.

By convention, silica glass ($SiO_2$) has been used as the glass for optical fibers. Because of the infrared absorption originating from an oscillation of the Si-O radical and the Rayleigh scattering, a wavelength region providing a low loss of the conventional optical fiber glass is limited within a range from the visible to near-infrared wavelength, that is, 0.6 to 1.7 $\mu$m. So far we know, there is found no optical fiber glass with a low loss in the infrared wavelength longer than the just-mentioned one. As mere infrared transmitting glass material, there is enumerated halide glass of halogen compound such as $BeF_2$ glass, $ZnCl_2$ glass, or $ZrF_4$-$ThF_4$-$BaF_2$ glass. In comparison with the $SiO_2$ glass, the halide glass allows rays with longer wavelength to transmit therethrough. Since $BeF_2$ and $ZnCl_2$, however, have deliquescency, infrared rays absorption increases arising from the aging by humidity, or the O—H radical of water. $BeF_2$ and $ThF_4$ are noxious to health because the former is strong toxic and the later is radio active. From a viewpoint of the number of components of the halogen compound for making the optical fiber glass, there is enumerated a ternary system. The fluoride glass made of the material of the ternary system containing $ZrF_4$ or $HfF_4$, $BaF_2$ and $ThF_4$ or $UF_4$ is disclosed in U.S. Pat. No. 4,141,741. As seen from the specification, the halogen compound of two compositions is improper for the optical fiber glass. In connection with the binary system glass, glass of $BeF_2$ compound is described in a paper "Journal of Non-Crystalline solids 31 (1979) 441-445, Holland". As described above, the $BeF_2$ compound has strong deliquescency and toxicity. In this respect, the $BeF_2$ compound is unsuitable for the optical fiber glass.

Accordingly, an object of the present invention is to provide glass for optical fibers which has low loss, low toxicity and low moisture absorption even in the infrared wavelength region of 2 $\mu$m or more, and which is suitable for the mass production of the optical fiber glass.

To achieve the above object, there is provided glass for optical fibers made of material of a binary system containing a fluoride selected from a first group of $BaF_2$, $SrF_2$, $CaF_2$ and $PbF_2$ and another fluoride selected from a second group of $AlF_3$ and $ZrF_4$.

Thus, since the optical fiber glass uses as its components $BaF_2$, $SrF_2$, $CaF_2$, $PbF_2$ and $AlF_3$ or $ZrF_4$, which have no deliquescency and toxicity, the glass for optical fibers is fairly safe in the manufacturing process and in practical use. Further, the loss of the glass for optical fibers is low in the infrared wavelength of 2 $\mu$m or more. Additionally, in manufacturing the optical fiber glass of the invention, the material in melting state is rapidly quenched and vitrified, so that the product is never crystallized. Because of this, the glass for optical fibers is suitable for the mass production of the optical fiber glass.

This invention can be more fully understood from the following detailed description when taken in conjunction with the accompanying drawings, in which.

Figure 1:
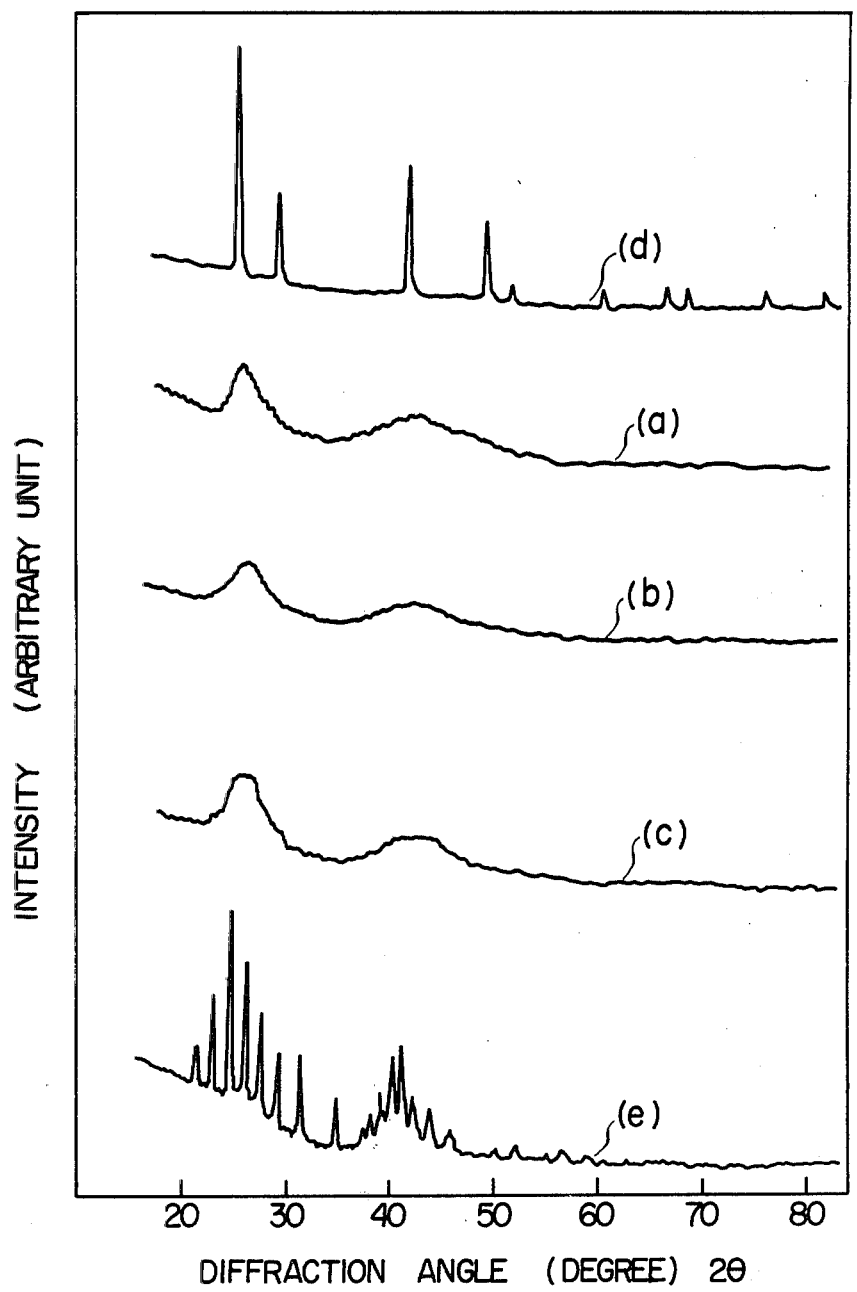
FIG. 1 is X-ray diffraction patterns to comparatively illustrate vitrified states of material of a binary system of $BaF_2$ and $AlF_3$ for the optical fiber glass of the present invention when the composition ratio of the material is changed variously.

Embodiments of the present invention will be described referring to the accompanying drawings.

An experiment conducted by the inventor showed that when the sum of a mol % value of fluoride selected from a group including $BaF_2$, $SrF_2$, $CaF_2$ and $PbF_2$ (referred to as a group A) and a mol % value of fluoride selected from a group of $AlF_3$ and $ZrF_4$ (referred to as a group B) is 100 mol %, the material for glass for optical fibers is vitrified without being crystallized, if those fluorides selected from the groups A and B have given mol % value. When the fluoride selected from the group A is 20 mol % or less, for example, crystal is formed in the fluoride glass and it is difficult to rapidly quench the material in a melting state in the manufacturing process. When it has 80 mol % or more, the material is easily crystallized. When the fluoride selected from the group B has 20 mol % or less, the material is devitrified and encounters a difficulty in its vitrification. When it has 80 mol % or more, in this case, the material is devitrified and its evaporation action is vigorous and the rapid quenching of the material in a melting state is difficult. As a consequence, it was concluded that the glass suitable for the optical fibers is obtainable by selecting its material with a mol % value other than 20 mol % or less and 80 mol % or more.

Examples of preferable mol % ranges of actual materials will be given below. When $AlF_3$ selected from the group B is added to $BaF_2$ selected from the group A, if the mol % sum of both the materials is 100 mol %, a range of more than 20 mol % to less than 40 mol %, especially a range of 22 to 36 mol %, is most preferable for $AlF_3$. When $AlF_3$ selected from the group B is added to $SrF_2$ selected from the group A, a range of more than 24 mol % to less than 70 mol %, especially 26 to 60 mol %, is most preferable for the $AlF_3$ when the mol % sum of both the material is 100 mol %. When $AlF_3$ from the group B is added to the $CaF_2$ selected from the group A, a range of more than 26 mol % to less than 70 mol %, especially 28 to 60 mol %, is preferable for $AlF_3$ if the mol % sum of both the materials is 100 mol %.

When $ZrF_4$ selected from the group B is added to $BaF_2$ selected from the group A, a range of more than 30 mol % to less than 80 mol %, especially 32 to 70 mol %, is most preferable for the $ZrF_4$ when the mol % sum of them is 100 mol %.

When $ZrF_4$ selected from the group B is added to $SrF_2$ selected from the group A, a range of more than 40 mol % to less than 80 mol %, especially 42 to 70 mol %, is most preferable for the $ZrF_4$ when the mol % sum of them is 100 mol %.

When $ZrF_4$ selected from the group B is added to $CaF_2$ selected from the group A, a range of more than 42 mol % to less than 80 mol %, especially 44 to 70 mol %, is most preferable for the $ZrF_4$ when the mol % sum of both is 100 mol %.

Different vitrified states of the glass, each determined by the mol ratio of the fluorides of the binary system were checked by the X-ray diffraction. Infrared transmission spectra at given mol ratios of the fluoride were measured.

Vitrified states of the materials depending on various composition ratios of the materials each containing a composition of fluoride selected from a group of $BaF_2$, $SrF_2$, $CaF_2$ and $PbF_2$ and another composition of fluoride selected from another group of $AlF_3$ and $ZrF_4$ and infrared transmission spectra for given composition ratios of the materials will be described referring to FIGS. 1 to 15.

FIG. 1 illustrates X-ray diffraction patterns for the material with different composition ratios when $BaF_2$ is selected from the group A and $AlF_3$, from the group B. A curve (a) in FIG. 1 illustrates an X-ray diffraction pattern plotted when 78 mol % of $BaF_2$ and 22 mol % of $AlF_3$ were mixed. The mixed powder of $BaF_2$—$AlF_3$ was put in a platinum crucible with a nozzle of 0.4 mm in diameter and was melted in atmosphere of Ar gas at 1,290° C. After the Ar gas pressure in the crucible was increased to 1.0 Kg/cm$^2$, the melted material was ejected through the nozzle onto the surface of a steel roller rotating at 15 m/sec of the surface velocity and was rapidly quenched. Through this process, a transparent material with the thickness of 15 $\mu$m, i.e. optical fiber glass, was formed. As seen from the curve (a) in FIG. 1, such sharp diffraction peaks as are observed when the crystalline phase is produced in the transparent material are not seen, but a halo pattern is observed. From this, it is seen that the mixed powder had been vitrified.

FIG. 1-(b) is an X-ray diffraction pattern for a transparent material formed when a mixed powder with 70 mol % of $BaF_2$ and 30 mol % of $AlF_3$ was processed under almost the same condition as mentioned above.

FIG. 1-(c) is an X-ray diffraction pattern for a transparent material formed when a mixed powder of 64 mol % of $BaF_2$ and 36 mol % of $AlF_3$ was processed under almost the same condition as in the (a) and (b) in FIG. 1. Also in both the curves, no sharp diffraction peaks produced in the crystalline phase are observed, but a halo pattern is observed. This indicates that the material had been vitrified.

FIG. 1-(d) is an X-ray diffraction pattern for a milky material with the thickness of about 15 $\mu$m formed when a mixed powder of 80 mol % of $BaF_2$ and 20 mol % of $AlF_3$ was processed under almost the same condition as in the cases (a) to (c) in FIG. 1.

FIG. 1-(e) is an X-ray diffraction pattern for a milky material of about 15 $\mu$m in thickness formed when a mixture of 60 mol % of $BaF_2$ powder and 40 mol % of $AlF_3$ powder was processed under almost the same condition as in the (a) to (d) in FIG. 1.

As seen from those curves (d) and (e), there are observed diffraction intensity peaks at given diffraction angles. This indicates that the crystal had been formed in the material.

Figure 2:
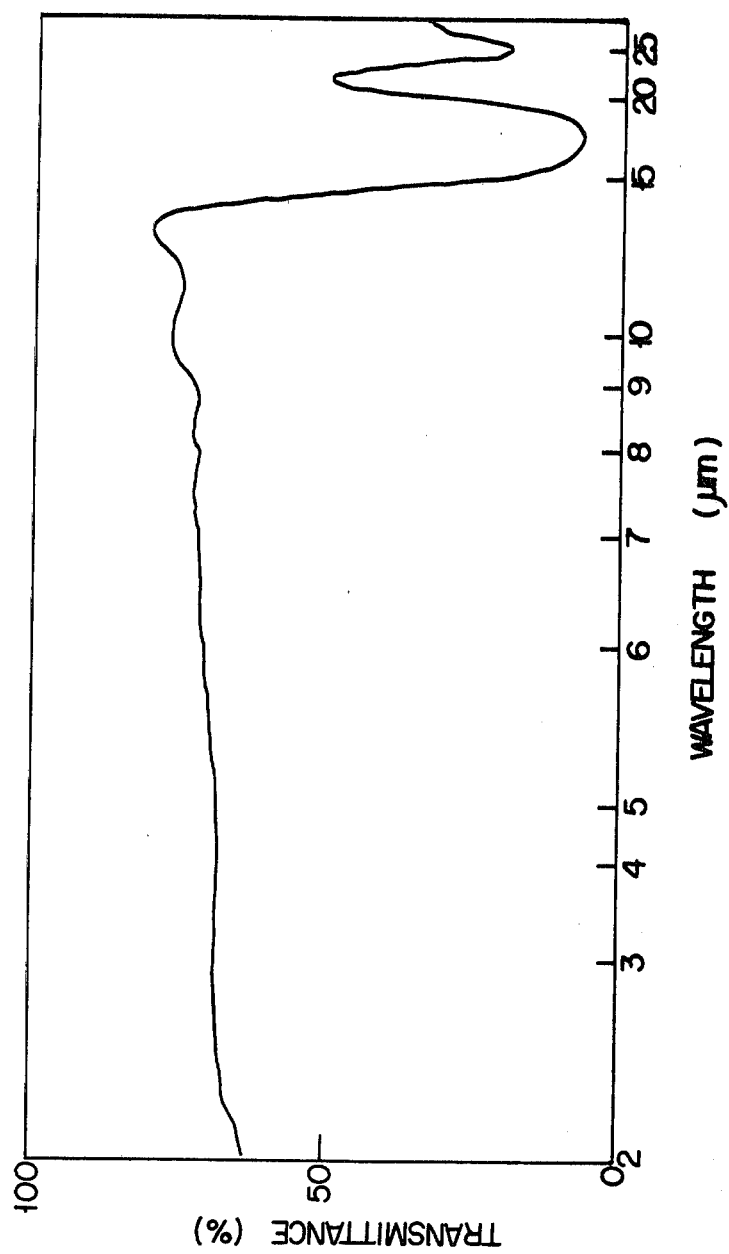
FIG. 2 is a graph of an infrared transmission spectrum for the material of the binary system of $BaF_2$ and $AlF_3$ when it has a given composition ratio.

A transmission spectrum for the optical fiber glass formed by processing $BaF_2$—$AlF_3$ powder mixture containing 64 mol % of $BaF_2$ and 36 mol % of $AlF_3$, was measured over wavelength from 2 to 30 $\mu$m after one year since it is fabricated. The result shown in FIG. 2 shows that no absorption by the O—H radical is observed in the infrared wavelength from 2 to 15 $\mu$m, thus ensuring a good transmission spectrum.

Figure 3:
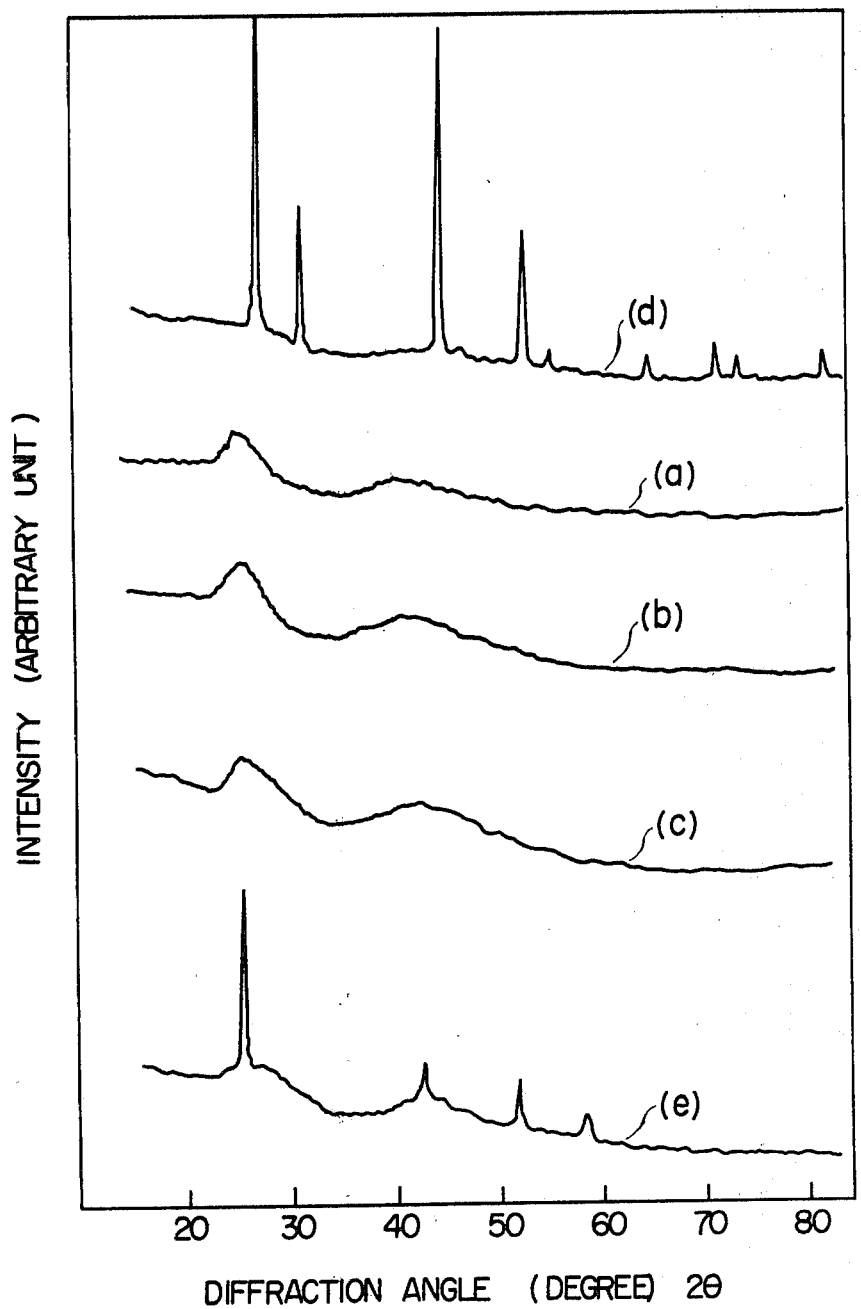
FIG. 3 is X-ray diffraction patterns to comparatively illustrate vitrified states of material of a binary system of $SrF_2$ and $AlF_3$ for the optical fiber glass of the invention when the composition ratio of the material is changed variously.
Figure 4:
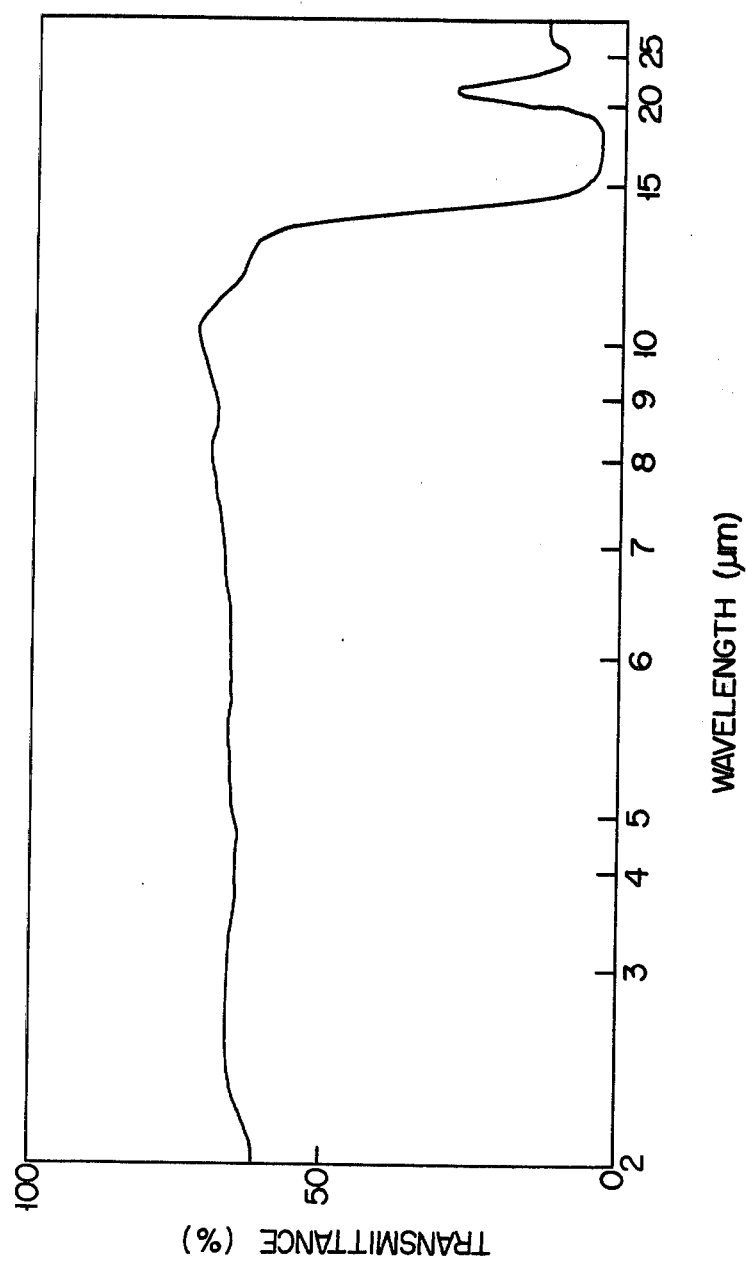
FIG. 4 is a graph of an infrared transmission spectrum for the material of the binary system of $SrF_2$ and $AlF_3$ when it has a given composition ratio.

FIG. 3 illustrates X-ray diffraction patterns for the material with different composition ratios when $SrF_2$ is selected from the group A and $AlF_3$, from the group B. The curve (a) in FIG. 1 illustrates an X-ray diffraction pattern depicted when 74 mol % of $SrF_2$ and 26 mol % of $AlF_3$ are mixed. The $SrF_2$-$AlF_3$ powder mixture was put in a platinum crucible with a nozzle of 0.4 mm in diameter and was melted in atmosphere of Ar gas at 1,400° C. After the Ar gas pressure in the crucible was increased to 1.0 Kg/cm$^2$, the melted material was ejected through the nozzle onto the surface of a steel roller rotating at 15 m/sec of the surface velocity and was rapidly quenched. Through this process, a transparent material with the thickness of 15 $\mu$m, i.e. optical fiber glass, was formed. As seen from the curve (a) in FIG. 3, no sharp diffraction peaks produced in the crystalline phase of the transparent material are found, but a halo pattern is observed. From this, it is seen that the material had been vitrified.

FIG. 3-(b) is an X-ray diffraction pattern for a transparent material formed when a powder mixture of 66 mol % of $SrF_2$ and 34 mol % of $AlF_3$ was processed under almost the same condition as mentioned above.

FIG. 3-(c) is an X-ray diffraction pattern for a transparent material formed when a powder mixture of 40 mol % of $SrF_2$ and 60 mol % of $AlF_3$ was processed under almost the same condition as in the FIG. 3-(b) case. Also in both the curves (b) and (c) in FIG. 3 no sharp diffraction peaks produced in the crystalline phase are found, but a halo pattern is observed. This indicates that the material had been vitrified.

FIG. 1-(d) is an X-ray diffraction pattern for a milky material with the thickness of about 15 μm formed when a powder mixture of 76 mol % of $SrF_2$ and 24 mol % of $AlF_3$ was processed under almost the same condition as in the cases (a) to (c) in FIG. 3.

FIG. 3-(e) is an X-ray diffraction pattern for a milky material of about 15 μm in thickness formed when a powder mixture of 30 mol % of $SrF_2$ and 70 mol % of $AlF_3$ was processed under almost the same condition as in the (a), (b), (c) and (d) in FIG. 3.

As seen from those curves (d) and (e), there are observed diffraction intensity peaks at given diffraction angles. This indicates that the crystal had been formed in the material.

A light transmission spectrum for the optical fiber glass formed by processing the powder mixture of 66 mol % of $SrF_2$ and 34 mol % of $AlF_3$ shown in (b) of FIG. 3, was measured over wavelength from 2 to 30 μm. The result shown in FIG. 4 indicates that no absorption by the O—H radical is observed in the infrared wavelength region from 2 to 14.5 μm, thus ensuring a good transmission spectrum.

Figure 5:
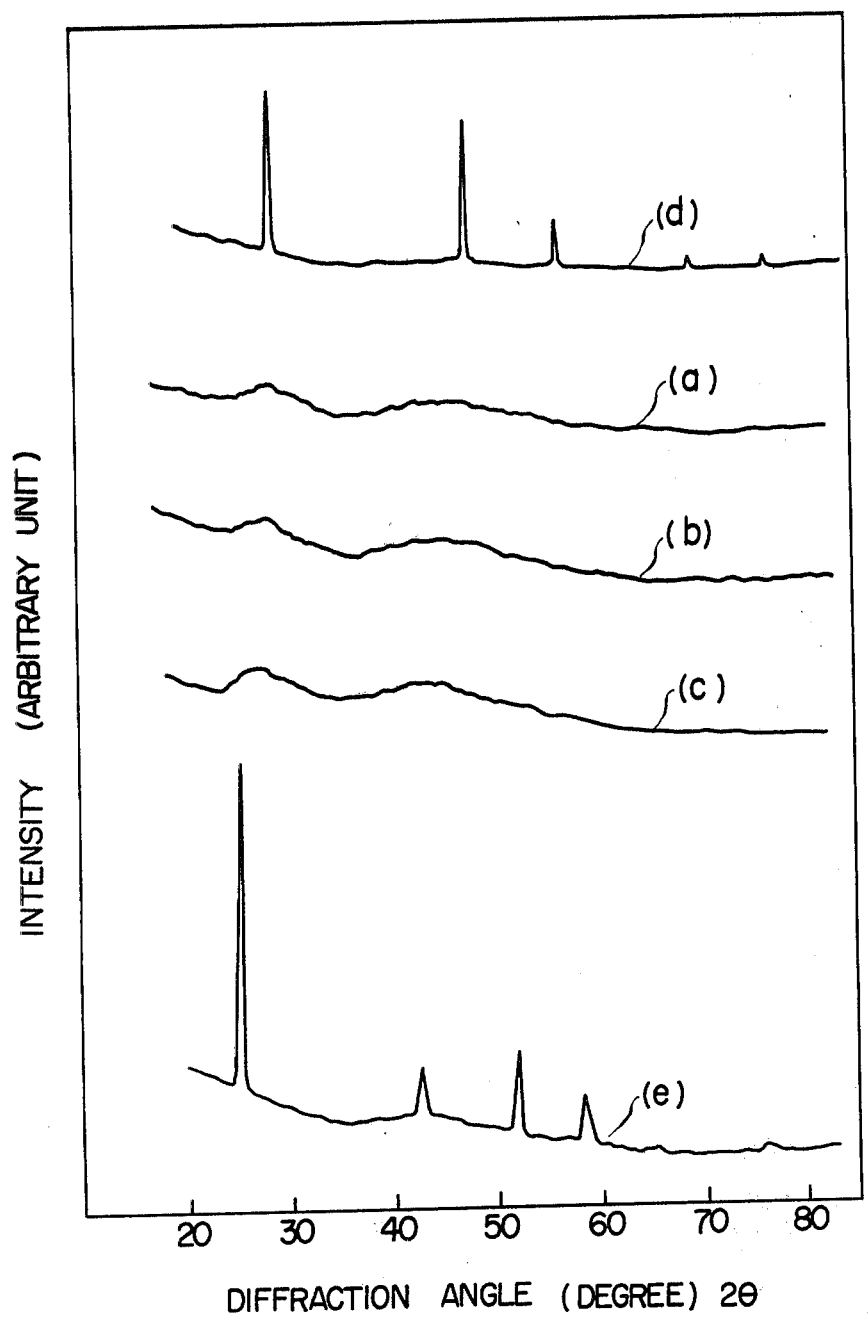
FIG. 5 is X-ray diffraction patterns to comparatively illustrate vitrified states of material of a binary system of $CaF_2$ and $AlF_3$ for the optical fiber glass of the invention when the composition ratio of the material is changed variously.

FIG. 5 illustrates X-ray diffraction patterns for the material with different composition ratios when $CaF_2$ is selected from the group A and $AlF_3$ from the group B. A curve (a) in FIG. 5 illustrates an X-ray diffraction pattern depicted when 72 mol % of $CaF_2$ and 28 mol % of $AlF_3$ are mixed. The $CaF_2$-$AlF_3$ powder mixture was put in a platinum crucible with a nozzle of 0.4 mm in diameter and was melted in atmosphere of Ar gas at 1,330° C. After the Ar gas pressure in the crucible was increased to 1.0 $Kg/cm^2$, the melted material was ejected through the nozzle onto the surface of a steel roller rotating at 15 m/sec of the peripheral speed and was rapidly quenched. Through this process, a transparent material with the thickness of about 15 μm, i.e. optical fiber glass, was formed. As seen from the curve (a) in FIG. 5, no peaks produced in the crystalline phase of the transparent material, is observed and a halo pattern is observed. From this, it is seen that the material has been vitrified.

FIG. 5-(b) is an X-ray diffraction pattern for a transparent material formed when a powder mixture of 60 mol % of $CaF_2$ and 40 mol % of $AlF_3$ was processed under substantially the same condition as mentioned above.

FIG. 5(c) is an X-ray diffraction pattern for a transparent material formed when a powder mixture of 40 mol % of $CaF_2$ and 60 mol % of $AlF_3$ was processed under substantially the same condition as in the FIGS. 5-(a) and 5-(b) cases. Also in both the curves (b) and (c), no sharp diffraction peaks produced in the crystalline phase are observed, but a halo pattern is observed. This indicates that the material had been vitrified.

FIG. 5-(d) is an X-ray diffraction pattern for a milky material with the thickness of about 15 μm formed when the powder mixture of 74 mol % of $CaF_2$ and 26 mol % of $AlF_3$ was processed under the same condition as in the cases (a) to (c) in FIG. 5.

FIG. 5-(e) is an X-ray diffraction pattern for a milky material of about 15 μm in thickness formed when the powder mixture of 30 mol % of $CaF_2$ and 70 mol % of $AlF_3$ was processed under the same condition as in the (a), (b), (c) and (d) in FIG. 5.

As seen from those curves (d) and (e) in FIG. 5, there are observed diffraction intensity peaks at given diffraction angles. This indicates that the crystal had been formed in the material.

Figure 6:
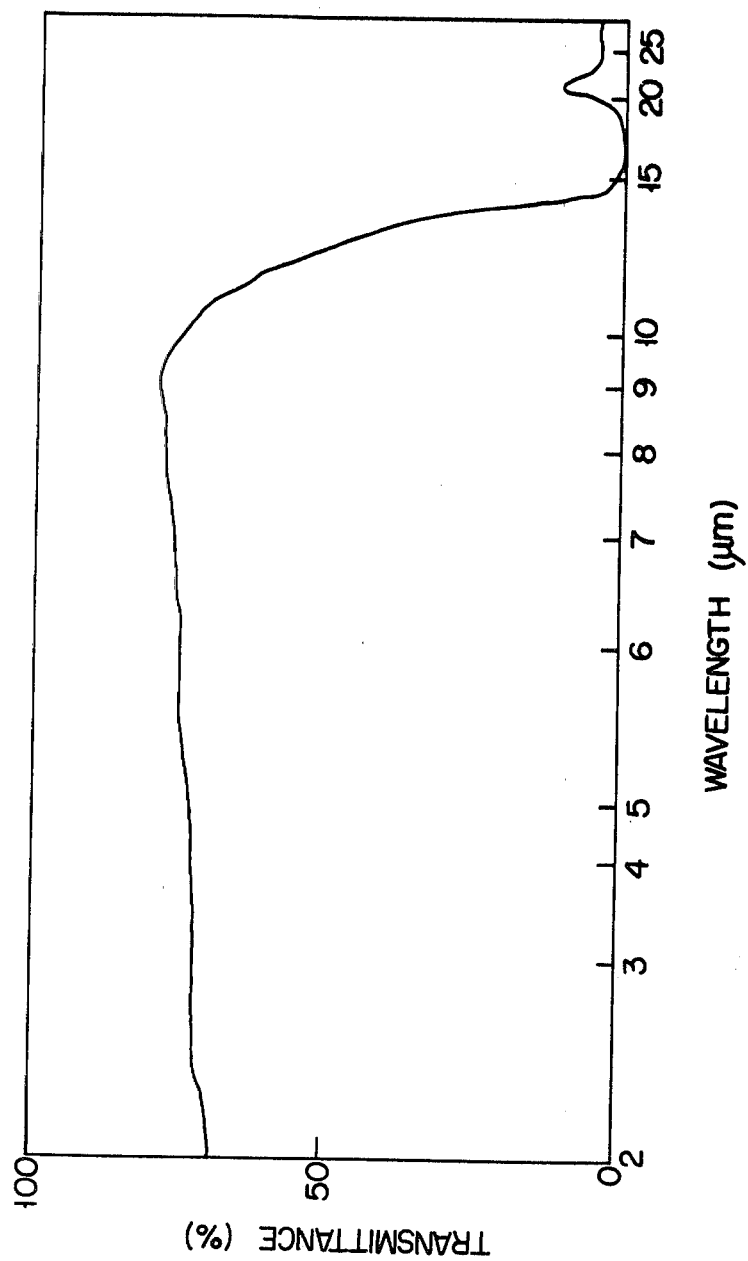
FIG. 6 is a graph of an infrared transmission spectrum for the material of the binary system of $CaF_2$ and $AlF_3$ when it has a given composition ratio.

A light transmission spectrum for the optical fiber glass formed by processing the powder mixture of containing 72 mol % of $CaF_2$ and 28 mol % of $AlF_3$ shown in (a) of FIG. 5, was measured over wavelength from 2 to 30 μm. The result shown in FIG. 6 shows that no absorption by the O—H radical is observed in the infrared wavelength region from 2 to 14 μm, thus ensuring a good transmission spectrum.

Figure 7:
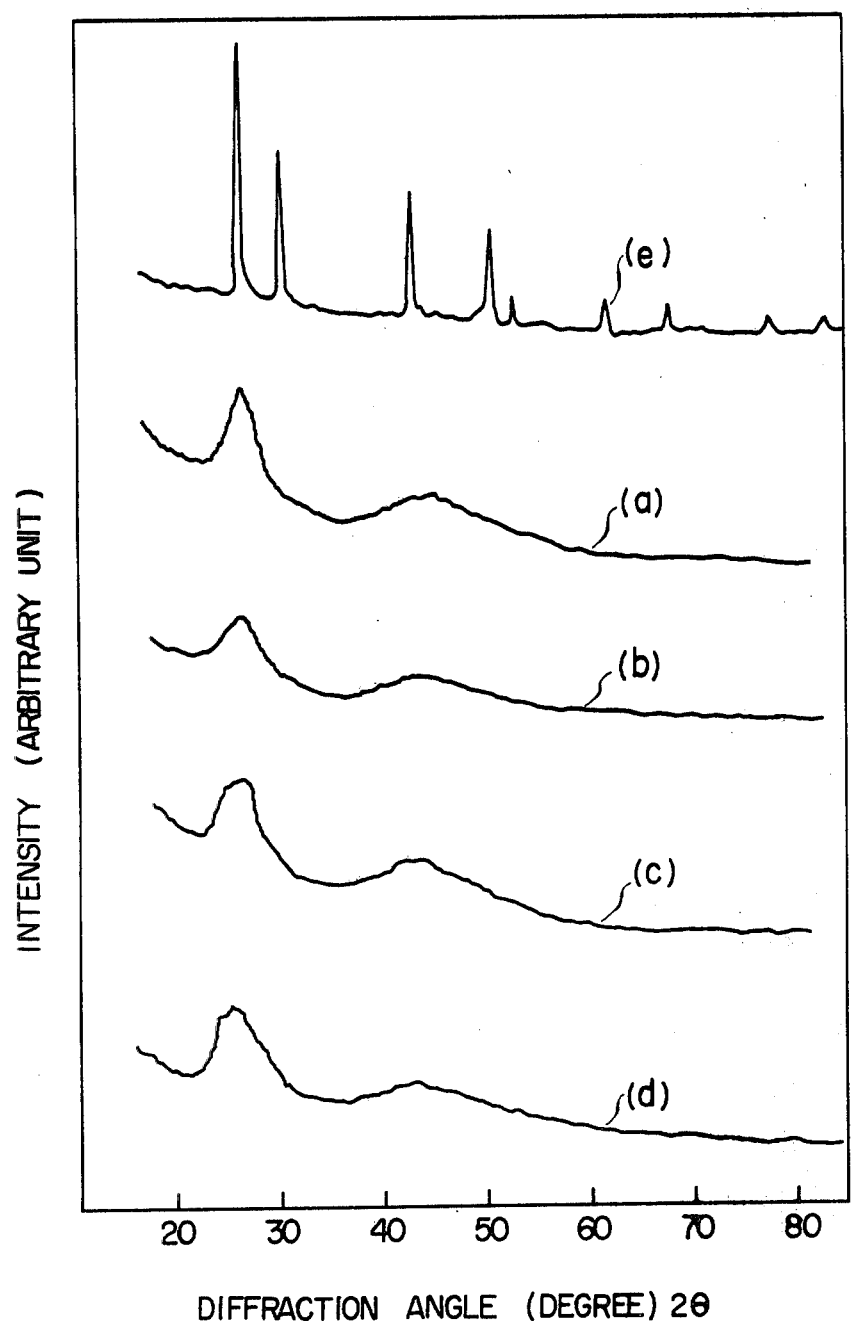
FIG. 7 is X-ray diffraction patterns to comparatively illustrate vitrified states of material of a binary system of $BaF_2$ and $ZrF_4$ for the optical fiber glass of the invention when the composition ratio of the material is changed variously.

FIG. 7 illustrates X-ray diffraction patterns for the material with different composition ratios when $BaF_2$ is selected from the group A and $ZrF_4$, from the group B. A curve (a) in FIG. 7 illustrates an X-ray diffraction pattern plotted when 68 mol % of $BaF_2$ and 32 mol % of $ZrF_4$ were mixed. The $BaF_2$-$ZrF_4$ powder mixture was put in a platinum crucible with a nozzle of 0.4 mm in diameter and was melted in atmosphere of Ar gas at 1,350° C. After the Ar gas pressure in the crucible was increased to 1.2 $Kg/cm^2$, the melted material was ejected through the nozzle onto the surface of a steel roller rotating at 15 m/sec of the surface velocity and was rapidly quenched. Through this process, a transparent material with the thickness of about 15 μm, i.e. optical fiber glass, was formed. As seen from the curve (a) in FIG. 7, no peaks produced in the crystalline phase of the transparent material, is observed, but a halo pattern is observed. From this, it is seen that the mixed powder had been vitrified.

FIG. 7-(b) is an X-ray diffraction pattern for a transparent material formed when a mixed powder with 60 mol % of $BaF_2$ and 40 mol % of $ZrF_4$ was processed under almost the same condition as mentioned above.

FIG. 7-(c) is an X-ray diffraction pattern for a transparent material formed when a powder mixture of 54 mol % of $BaF_2$ and 46 mol % of $ZrF_4$ was processed under almost the same condition as in the FIGS. 7-(a) and 7-(b).

FIG. 7-(d) is an X-ray diffraction pattern for a transparent material with the thickness of about 15 μm formed when the powder mixture of 30 mol % of $BaF_2$ and 70 mol % of $ZrF_4$ was processed under almost same condition as in the cases (a) to (c) in FIG. 5. Also in both the curves, no sharp diffraction peaks produced in the crystalline phase are observed, but a halo pattern is observed. This indicates that the material had been vitrified.

FIG. 7-(e) is an X-ray diffraction pattern for a milky material of about 15 μm in thickness formed when the powder mixture of 70 mol % of $BaF_2$ and 30 mol % of $ZrF_4$ was processed under almost the same condition as in the (a), (b), (c) and (d) in FIG. 7.

As seen from the curve (e), there are observed diffraction intensity peaks at given diffraction angles. This indicates that the crystal had been formed in the material.

Figure 8:
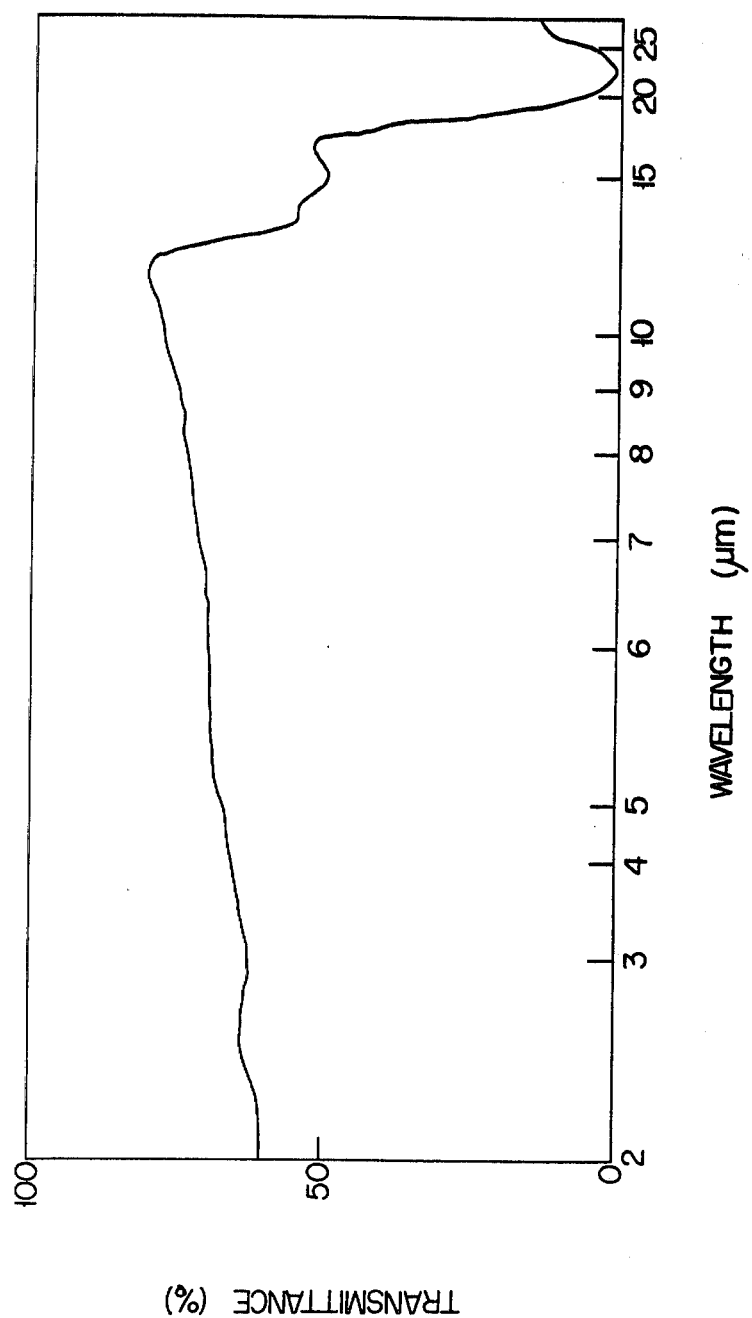
FIG. 8 is a graph of an infrared transmission spectrum for the material of the binary system of $BaF_2$ and $ZrF_4$ for the optical fiber glass of the invention.

A light transmission spectrum for the optical fiber glass formed by processing the powder mixture of 60 mol % of $BaF_2$ and 40 mol % of $ZrF_4$ shown in (b) of FIG. 7, was measured over wavelength from 2 to 30 μm. The result shown in FIG. 8 shows that no absorption by the O—H radical is observed in the infrared wavelength region from 2 to 20 μm, thus ensuring a good transmission spectrum.

Figure 9:
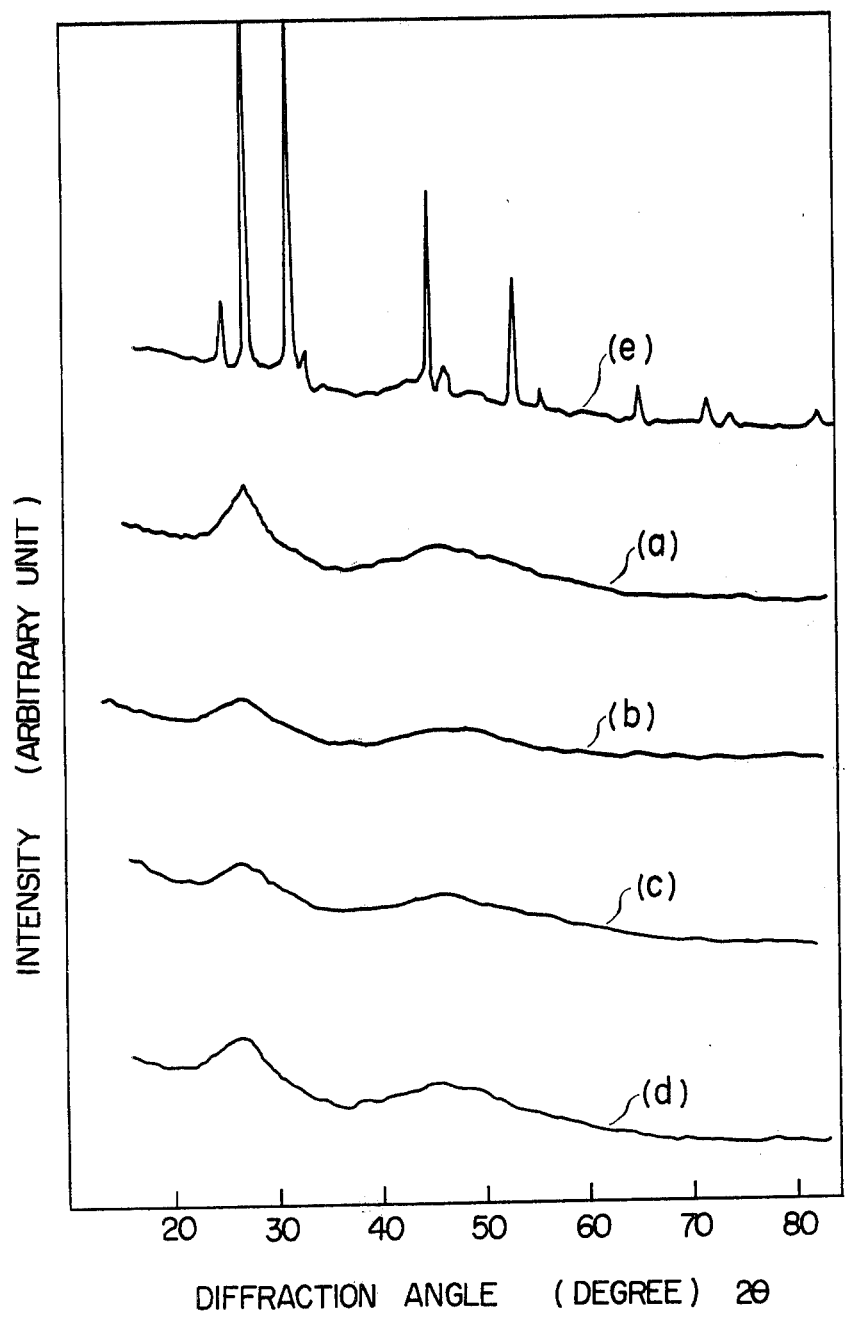
FIG. 9 is X-ray diffraction patterns to comparatively illustrate vitrified states of material of a binary system of $SrF_2$ and $ZrF_4$ for the optical fiber glass of the invention when the composition ratio of the material is variously changed.

FIG. 9 illustrates X-ray diffraction patterns for the material with different composition ratios when $SrF_2$ is selected from the group A and $ZrF_4$ from the group B. In FIG. 9-(a) illustrates an X-ray diffraction pattern depicted when 58 mol % of $SrF_2$ and 42 mol % of $ZrF_4$ are mixed, (b) is an X-ray diffraction pattern for the material made of 50 mol % of $SrF_2$ and 50 mol % of $ZrF_4$(c) is an X-ray diffraction pattern for the material made of 44 mol % of $SrF_2$ and 56 mol % of $ZrF_4$, (d) is an X-ray diffraction pattern for the material made of 30 mol % of $SrF_2$ and 70 mol % of $ZrF_4$.

The $SrF_2$-$ZrF_4$ powder mixture was put in a platinum crucible with a nozzle of 0.4 mm in diameter and was melted in Ar gas at 1,430° C. After the Ar gas pressure in the crucible was increased to 1.2 Kg/cm$^2$. Then, the melted material was ejected through the nozzle onto the surface of a steel roller rotating at 15 m/sec of the surface velocity and was rapidly quenched. Through this process, a transparent material with the thickness of 15 μm, i.e. optical fiber glass, was formed. As seen from the curves (a) to (d) in FIG. 9, no peaks produced in the crystallizing phase are observed, but a halo pattern is observed. From this, it is seen that the mixed powder had been vitrified.

In FIG. 9, (e) is an X-ray diffraction pattern for a milky material of about 15 μm in thickness formed when the powder mixture of 60 mol % of $SrF_2$ and 40 mol % of $ZrF_4$ was processed under almost the same condition as in the (a), (b), (c) and (d).

As seen from the curve (e), there are observed diffraction intensity peaks at given diffraction angles. This indicates that the crystal had been formed in the material.

Figure 10:
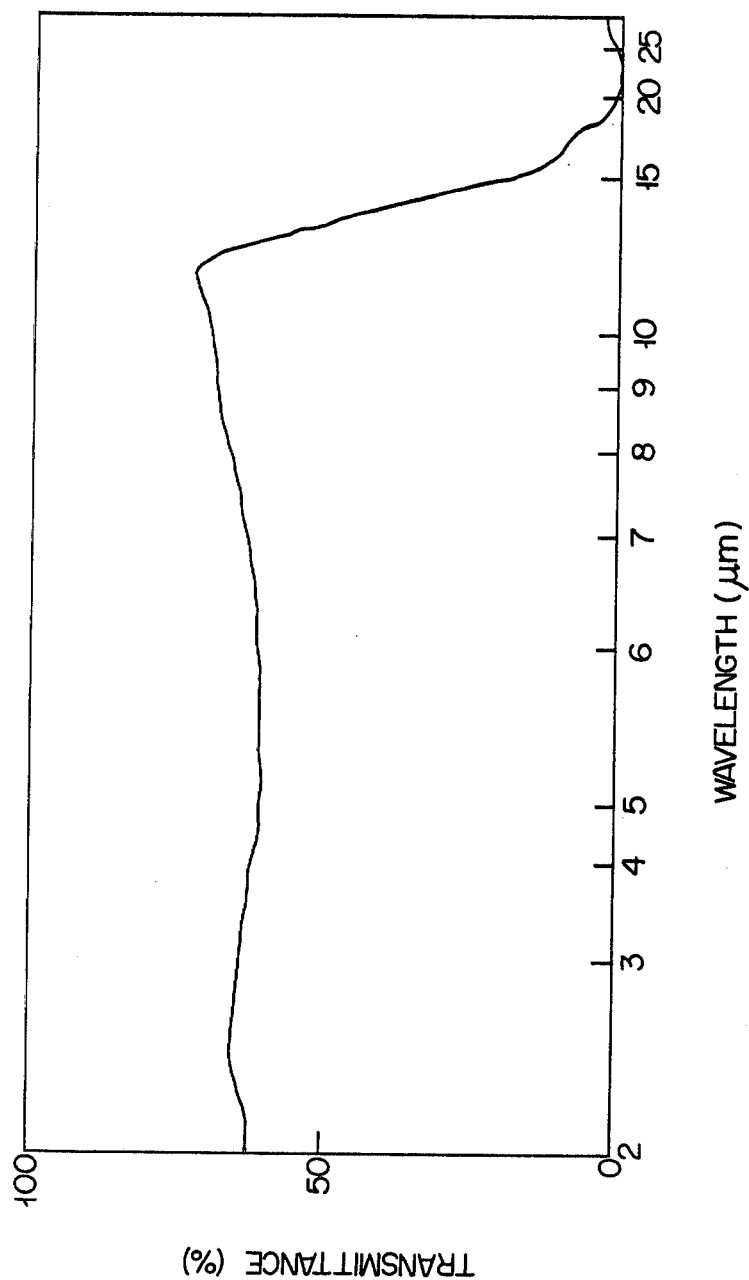
FIG. 10 is a graph of an infrared transmission spectrum for the material of the binary system of $SrF_2$ and $ZrF_4$ when it has a given composition ratio.

A light transmission spectrum for the optical fiber glass formed by processing the powder mixture of 50 mol % of $SrF_2$ and 50 mol % of $ZrF_4$ shown in (b) of FIG. 9, was measured over wavelength from 2 to 30 μm. The result shown in FIG. 10 shows that no absorption by the O—H radical is observed in the infrared wavelength region from 2 to 16.5 μm, thus ensuring a good transmission spectrum.

Figure 11:
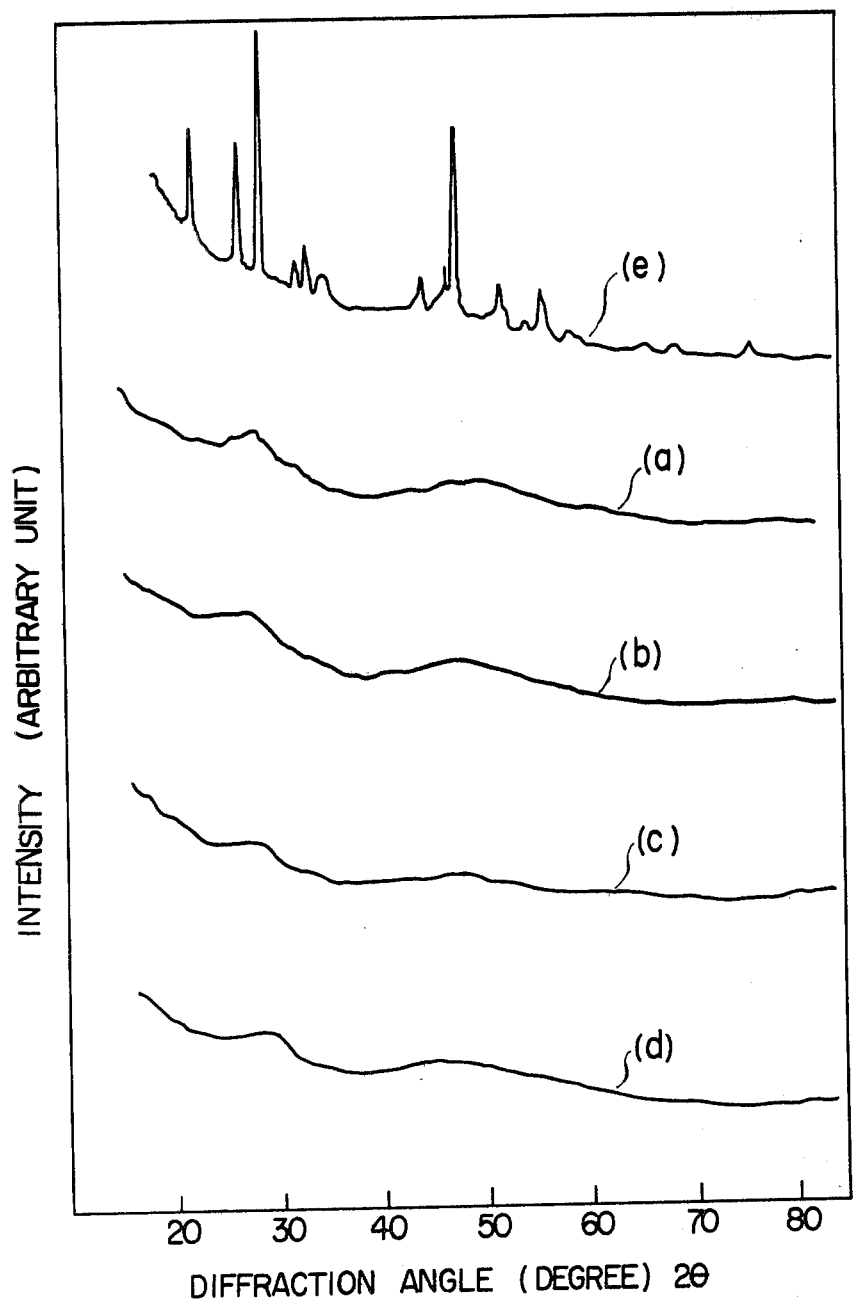
FIG. 11 is X-ray diffraction patterns to comparatively illustrate vitrified states of material of a binary system of $CaF_2$ and $ZrF_4$ for the optical fiber glass of the invention when the composition ratio of the material is variously changed.

FIG. 11 illustrates X-ray diffraction patterns for the material with different composition ratios when $CaF_2$ is selected from the group A and $ZrF_4$ from the group B. In FIG. 11, (a) illustrates an X-ray diffraction pattern plotted when 56 mol % of $CaF_2$ and 44 mol % of $ZrF_4$ are mixed, (b) is an X-ray diffraction pattern for the material made of 50 mol % of $CaF_2$ and 50 mol % of $ZrF_4$, (c) is an X-ray diffraction pattern for the material made of 46 mol % of $CaF_2$ and 54 mol % of $ZrF_4$, (d) is an X-ray diffraction pattern for the material made of 30 mol % of $CaF_2$ and 70 mol % of $ZrF_4$.

The $CaF_2$-$ZrF_4$ powder mixture was put in a platinum crucible with a nozzle of 0.4 mm in diameter and was melted in Ar gas atmosphere at 1,330° C. After the Ar gas pressure in the crucible was increased to 0.8 Kg/cm$^2$, the melted material was ejected through the nozzle onto the surface of a steel roller rotating at 20 m/sec of the surface velocity and was rapidly quenched. Through this process, a transparent material with the thickness of 10 μm, i.e. optical fiber glass, was formed. As seen from the curves (a) to (d) in FIG. 11, no peaks produced in the crystallizing phase in the transparent material are observed, but a halo pattern is observed. From this, it is seen that the mixed powder had been vitrified.

In FIG. 11, (e) is an X-ray diffraction pattern for a milky material of about 10 μm in thickness formed when the powder mixture of 58 mol % of $CaF_2$ and 42 mol % of $ZrF_4$ was processed under almost the same condition as in the (a), (b), (c) and (d).

As seen from the curve (e), there are observed diffraction intensity peaks at given diffraction angles. This indicates that the crystal had been formed in the material.

Figure 12:
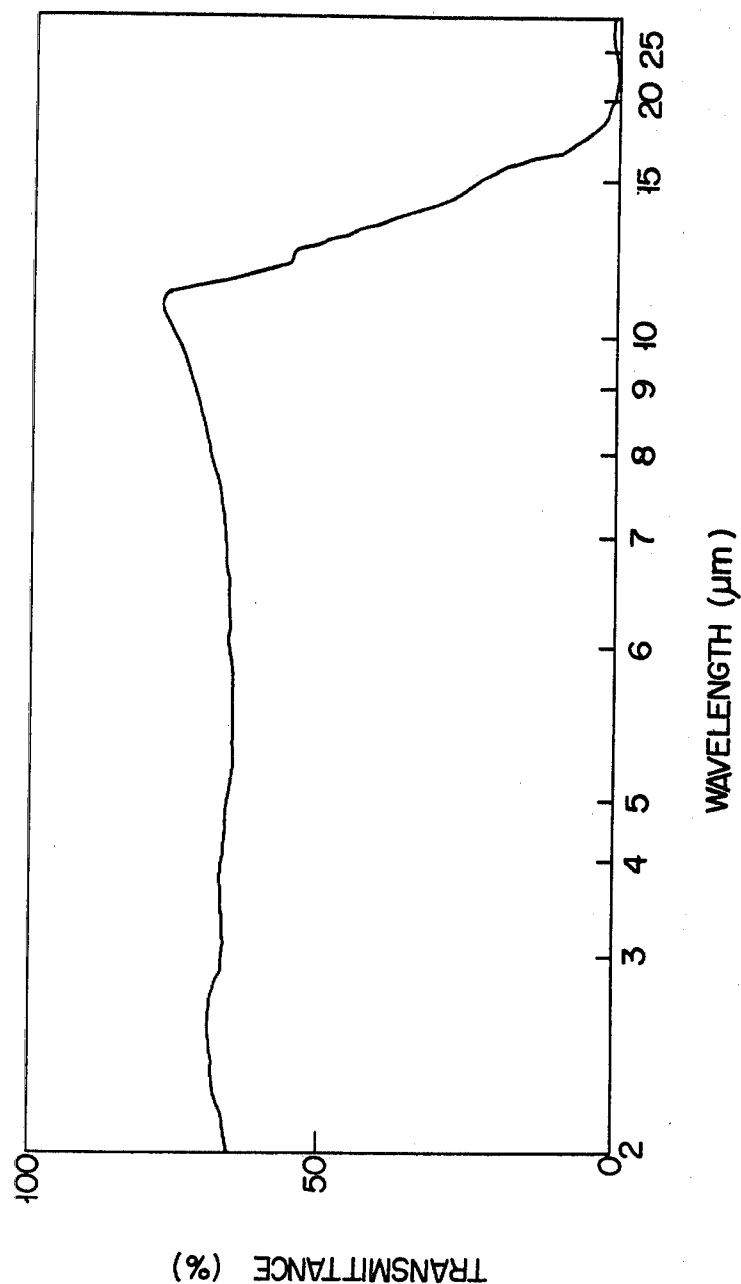
FIG. 12 is a graph of an infrared transmission spectrum for the material of the binary system of $CaF_2$ and $ZrF_4$ when it has a given composition ratio.

A light transmission spectrum for the optical fiber glass formed by processing the powder mixture of 56 mol % of $CaF_2$ and 44 mol % of $ZrF_4$ shown in (b) of FIG. 11, was measured over wavelength from 2 to 30 μm. The result shown in FIG. 12 shows that no absorption by the O—H radical is observed in the infrared wavelength region from 2 to 17 μm, thus ensuring a good transmission spectrum.

An embodiment of the invention when $ZrF_4$ selected from the group B is added to $PbF_2$ from the group A, will be described. If an amount of the addition of $ZrF_4$ is 30 mol % or less when the mol % sum of both the fluorides is 100 mol %, the transparent material as the product is crystallized, while no vitrification of the mixed powder is made. When an amount of $ZrF_4$ was 70 mol % or more, the evaporation of the $ZrF_4$ was active and the rapid quenching of the $ZrF_4$ in the melting state was difficult. The vitrification of the powder was made when $ZrF_4$ of 36 mol % or more to 65 mol % or less was added to $PbF_2$.

Figure 13:
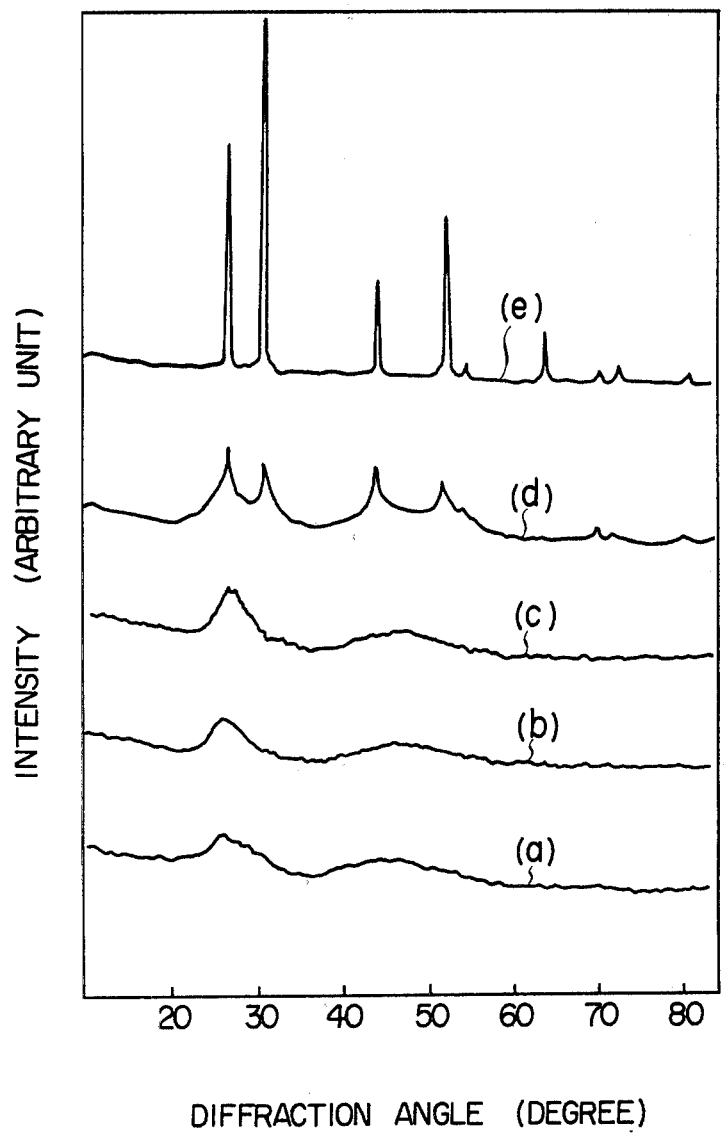
FIG. 13 is X-ray diffraction patterns to comparatively illustrate vitrified states of material of a binary system of $PbF_2$ and $ZrF_4$ for the optical fiber glass of the invention when the composition ratio of the material is variously changed.

A curve (a) in FIG. 13 illustrates an X-ray diffraction pattern depicted when 35 mol % of $PbF_2$ and 65 mol % of $ZrF_4$ were mixed. The $PbF_2$-$ZrF_4$ powder mixture was put in a platinum crucible with a nozzle of 0.6 in diameter and was melted in atmosphere of Ar gas at 1,250° C. After the Ar gas pressure in the crucible was increased to 1.5 Kg/cm$^2$, the melted material was ejected through the nozzle onto the surface of a steel roller rotating at 15 m/sec of the surface velocity and was rapidly quenched. Through this process, a transparent material with the thickness of about 20 μm was formed. As seen from the curve (a) in FIG. 13, no peaks produced in the crystallization phase in the transparent material are observed, but a halo pattern is observed. For this, it is seen that the mixed powder had been vitrified.

Figure 14:
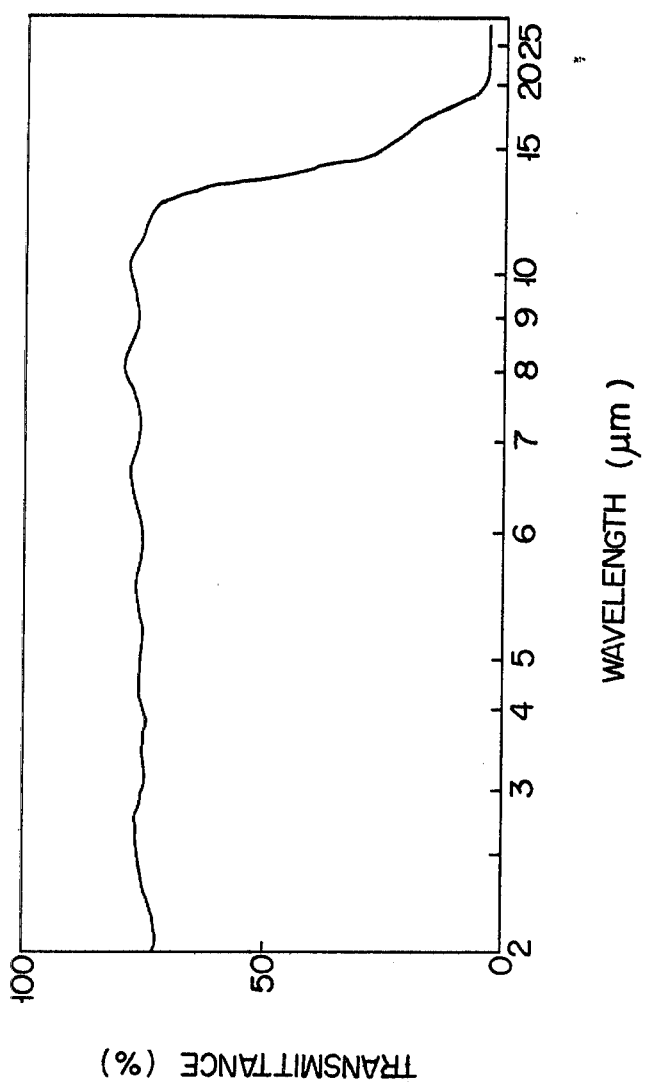
FIG. 14 is a graph of an infrared transmission spectrum for the material of the binary system of $PbF_2$ and $ZrF_4$ when it has a given composition ratio.

In FIG. 13, (b) is an X-ray diffraction diagram for a transparent material with the thickness of about 15 μm formed when the powder mixture of 50 mol % of $PbF_2$ and 50 mol % of $ZrF_4$ was processed. The $PbF_2$-$ZrF_4$ powder mixture was put in a platinum crucible with a nozzle of 0.6 mm in diameter and was melted in atmosphere of Ar gas at 1,100° C. After the Ar gas pressure in the crucible was increased to 0.8 Kg/cm$^2$. Then, the melted material was ejected through the nozzle onto the surface of a steel roller rotating at 15 m/sec of the surface velocity and was rapidly quenched. Through this process, a transparent material with the thickness of about 15 μm was formed. The transmission spectrum of the optical fiber glass of the transparent material was measured over wavelength from 2 to 30 μm. The result shown in FIG. 14 shows that no absorption by the O—H radical is observed in the infrared wavelength region from 2 to 18.5 μm, thus ensuring a good transmission spectrum.

In FIG. 13, (c) is an X-ray diffraction pattern for a transparent material formed when a powder mixture of 64 mol % of $BaF_2$ and 36 mol % of $ZrF_4$ was processed under almost the same condition as in the FIG. 13-(b) case. Also in both the curves, no sharp diffraction peaks produced in the crystalline phase are found, but a halo pattern is observed. This indicates the material had been vitrified.

Figure 15:
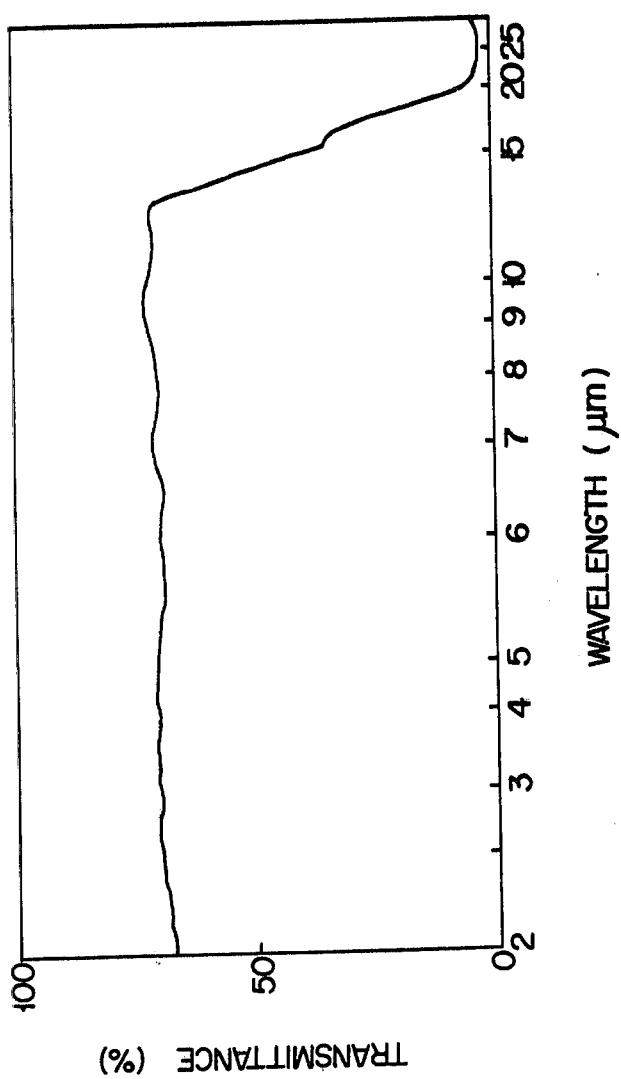
FIG. 15 is a graph of an infrared transmission spectrum for the material of the binary composition system of $PbF_2$ and $ZrF_4$ when it has a composition ratio different from that shown in FIG. 14.

A light transmission spectrum for the optical fiber glass in FIG. 13-(c) was measured over wavelength from 2 to 30 μm. The result shown in FIG. 15 shows that no absorption by the O—H radical is observed in the infrared wavelength region from 2 to 19 μm, thus ensuring a good transmission spectrum.

In FIG. 13, (d) is an X-ray diffraction diagram for a milky material with the thickness of about 20 μm formed when a powder mixture of 66 mol % of $PbF_2$ and 34 mol % of $ZrF_4$ was processed.

In this case, the mixed powder of $PbF_2$-$ZrF_4$ was put in a platinum crucible with a nozzle of 0.6 mm in diameter and after the Ar gas pressure in the crucible was increased to 1.0 Kg/cm², the melted material was ejected through the nozzle onto the surface of a steel roller rotating at 15 m/sec of the surface velocity and was rapidly quenched. Through this process, a transparent material with the thickness of 10 μm, was formed.

FIG. 13-(e) is an X-ray diffraction pattern for a milky material of about 20 μm in thickness formed when the powder mixture of 70 mol % of $PbF_2$ and 30 mol % of $ZrF_4$ was processed.

In this case, the mixed powder was processed under almost the same condition as in (a) in FIG. 13.

In the (d) of FIG. 13, there are observed the halo indicating the vitrified state and further the diffraction peaks indicating the crystallization. This indicates partial crystallization of the material. In the (e) of FIG. 13, the diffraction peaks at given diffraction angles are observed. This indicates a perfect crystallization of the mixed powder.

The above-mentioned embodiment uses the mixed powder of the exact binary system, but so long as the powder is essentially of the binary system, other additions contained therein are allowed.

What we claim is:

1. Glass for optical fibers made of material of binary system consisting essentially of more than 20 mol % and less than 80 mol % of a fluoride selected from a first group of $BaF_2$, $SrF_2$, $CaF_2$ and $PbF_2$ and more than 20 mol % and less than 80 mol % of another fluoride selected from a second group of $AlF_3$ and $ZrF_4$.

2. Glass for optical fibers according to claim 1, wherein $BaF_2$ is selected from the first group and is within the range of 78 mol % to 64 mol % and $AlF_3$ is selected from the second grouop and is within the range of 22 mol % to 36 mol %.

3. Glass for optical fibers according to claim 1, wherein $SrF_2$ is selected from the first group and is within the range of 74 mol % to 40 mol % and $AlF_3$ is selected from the second group and is within the range of 26 mol % to 60 mol %.

4. Glass for optical fibers according to claim 1, wherein $CaF_2$ is selected from the first group and is within the range of 72 mol % to 40 mol % and $AlF_3$ is selected from the second group and is within the range of 28 mol % to 60 mol %.

5. Glass for optical fibers according to claim 1, wherein $BaF_2$ is selected from the first group and is within the range of 68 mol % to 30 mol % and $ZrF_4$ is selected from the second group and is within the range of 32 mol % to 70 mol %.

6. Glass for optical fibers according to claim 1, wherein $SrF_2$ is selected from the first group and is within the range of 58 mol % to 30 mol % and $ZrF_4$ is selected from the second group and is within the range of 42 mol % to 70 mol %.

7. Glass for optical fibers according to claim 1, wherein $CaF_2$ is selected from the first group and is within the range of 56 mol % to 30 mol % and $ZrF_4$ is selected from the second group and is within the range of 44 mol % to 70 mol %.

8. Glass for optical fibers according to claim 1, wherein $PbF_2$ is selected from the first group and is within the range of 64 mol % to 35 mol % and $ZrF_4$ is selected from the second group and is within the range of 36 mol % to 65 mol %.

* * * * *

UNITED STATES PATENT AND TRADEMARK OFFICE
CERTIFICATE OF CORRECTION

PATENT NO. : 4,308,066
DATED : December 29, 1981
INVENTOR(S) : MITACHI et al

It is certified that error appears in the above—identified patent and that said Letters Patent is hereby corrected as shown below:

Column 7, line 41: replace "2 to .30" with --2 to 30--.

Signed and Sealed this

Twenty-second Day of June 1982

[SEAL]

Attest:

Attesting Officer

GERALD J. MOSSINGHOFF
Commissioner of Patents and Trademarks